United States Patent
Pley

(10) Patent No.: US 9,808,795 B2
(45) Date of Patent: Nov. 7, 2017

(54) METHODS FOR REPROCESSING USED CATALYSTS

(71) Applicant: TROPINON ENTERPRISES LTD., Nicosia (CY)

(72) Inventor: Martin Pley, Memmelsdorf (DE)

(73) Assignee: Tropinon Enterprises Ltd., Nicosia (CY)

( * ) Notice: Subject to any disclaimer, the term of this patent is extended or adjusted under 35 U.S.C. 154(b) by 0 days.

(21) Appl. No.: 15/306,884

(22) PCT Filed: Feb. 3, 2015

(86) PCT No.: PCT/EP2015/000209
§ 371 (c)(1),
(2) Date: Oct. 26, 2016

(87) PCT Pub. No.: WO2015/165557
PCT Pub. Date: Nov. 5, 2015

(65) Prior Publication Data
US 2017/0050183 A1    Feb. 23, 2017

(30) Foreign Application Priority Data
Apr. 30, 2014  (EP) .................................. 14001537

(51) Int. Cl.
| | | |
|---|---|---|
| *B01J 38/68* | (2006.01) | |
| *C22B 7/00* | (2006.01) | |
| *B01J 38/48* | (2006.01) | |
| *B01J 38/60* | (2006.01) | |
| *B01J 38/64* | (2006.01) | |
| *B01J 23/22* | (2006.01) | |
| *B01J 23/28* | (2006.01) | |
| *B01J 23/30* | (2006.01) | |
| *B01J 23/92* | (2006.01) | |
| *C22B 1/24* | (2006.01) | |
| *C22B 34/34* | (2006.01) | |
| *C22B 34/36* | (2006.01) | |

(52) U.S. Cl.
CPC ............... *B01J 38/68* (2013.01); *B01J 23/22* (2013.01); *B01J 23/28* (2013.01); *B01J 23/30* (2013.01); *B01J 23/92* (2013.01); *B01J 38/485* (2013.01); *B01J 38/60* (2013.01); *B01J 38/64* (2013.01); *C22B 1/24* (2013.01); *C22B 7/007* (2013.01); *C22B 7/008* (2013.01); *C22B 7/009* (2013.01); *C22B 34/345* (2013.01); *C22B 34/365* (2013.01); *Y02P 10/214* (2015.11)

(58) Field of Classification Search
CPC .................................. B01J 38/68; B01J 23/22
USPC ........................................................... 502/24
See application file for complete search history.

(56) References Cited

U.S. PATENT DOCUMENTS

| | | | |
|---|---|---|---|
| 4,833,113 A | 5/1989 | Imanari et al. | |
| 5,837,635 A | 11/1998 | Kischkewitz et al. | |

FOREIGN PATENT DOCUMENTS

| | | |
|---|---|---|
| CN | 103 088 216 A | 5/2013 |
| KR | 2012 0107550 A | 10/2012 |

OTHER PUBLICATIONS

International Search Report and Written Opinion prepared by the European Patent Office on Aug. 19, 2015, for International Application No. PCT/EP2015/000209.

*Primary Examiner* — Edward Johnson
(74) *Attorney, Agent, or Firm* — Sheridan Ross P.C.

(57) ABSTRACT

The following invention relates to methods for reprocessing SCR catalysts. In a first embodiment, the invention relates to a method for reprocessing SCR catalysts, wherein an oxygen-containing compound of titanium and tungsten or molybdenum is removed from the catalyst and is then reacted with a vanadium compound. In a second embodiment, the invention relates to a method for removing titanium oxide and vanadium, molybdenum, and tungsten compounds from SCR catalysts and to a method for reusing these compounds in such catalysts.

14 Claims, No Drawings

METHODS FOR REPROCESSING USED CATALYSTS

CROSS REFERENCE TO RELATED APPLICATIONS

This application is a national stage application under 35 U.S.C. 371 and claims the benefit of PCT Application No. PCT/EP2015/000209 having an international filing date of 3 Feb. 2015, which designated the United States, which PCT application claimed the benefit of European Patent Application No. 14001537.1 filed 30 Apr. 2014, the disclosure of each of which are incorporated herein by reference in their entirety.

FIELD OF THE INVENTION

The following invention relates to methods for reprocessing SCR catalysts. In a first embodiment, the invention relates to a method for reprocessing SCR catalysts, wherein an oxygen-containing titanium and tungsten or molybdenum compound is removed from the catalyst and is then reacted with a vanadium compound. In a second embodiment, the invention relates to a method for removing titanium oxide and vanadium, molybdenum, and tungsten compounds from SCR catalysts and to a method for reusing these compounds in such catalysts.

PRIOR ART

Titanium-based catalysts, particularly SCR (Selective Catalytic Reduction) catalysts, are used in various applications for reducing nitrogen oxide emissions. There are essentially two different types of SCR catalysts used, specifically honey-comb and plate catalysts.

Fully-extruded honeycomb catalysts essentially consist of a mixture of titanium (IV) oxide (approx. 85 wt. %), titanium(VI) oxide (approx. 10 wt. %), and vanadium (V) oxide (approx. 2 wt. %), relative to the total weight of the composition. This type of SCR catalyst is preferably used for nitrogen oxide reduction in waste incineration plants (low-dust configuration), in stationary and mobile gas and diesel engines, and in gas turbines. This catalyst type has a market share of approx. 90% relative to the two types of SCR catalysts.

Plate catalysts are composed of a metallic carrier substrate, preferably expanded metal (approx. 50 wt. %), and a coating of titanium(IV) oxide (approx. 45 wt. %), molybdenum(VI) oxide (approx. 2.5 wt. %), and vanadium(V) oxide (approx. 1 wt. %), relative to the total weight of the catalyst. These catalysts are primarily used for nitrogen oxide reduction in coal-fired power plants and waste incineration in the high-dust configuration and in incineration of biomass. Because of their structure, these catalysts are particularly well-suited for applications involving high dust loads.

As further components, the compositions may also contain silicon and/or aluminium compounds, preferably silicon compounds.

The life expectancy of SCR catalysts essentially depends on the type of fuel or propellant, the dust content of the exhaust, and the exhaust temperature. The typical duration of operation is 16,000-24,000 hours in coal-fired power plants, approx. 16,000 hours in marine diesel engines, and up to 50,000 hours in gas turbines.

Depending on the respective duration of application, catalysts can either be disposed of or regenerated by chemical methods.

In the case of disposal, honeycomb catalysts are finally stored for a fee in a hazardous waste landfill. In this case, the disposal cost to the operator can be as high as € 750.00 per cubic meter of catalyst. In the field of steel production, because of their high content of stainless steel (carrier substrate), plate catalysts can be melted down.

In regeneration of honeycomb catalysts, the catalysts are first purified of adhesions using a physical process, preferably ultrasound or compressed air, and then post-treated with a vanadium-containing solution. In this case, the activity can again be increased to approx. 90% of the original activity. However, the tendency toward deactivation of these regenerated catalysts is significantly higher than that of new catalysts. The costs of regenerated SCR are approx. 60% of those of new catalysts. A method for regeneration is described in EP 0353467.

In the "non-automotive area", the current world market for titanium oxide-based honeycomb catalysts is approx. 200,000 $m^3$ per year, and the market for SCR plate catalysts is approx. 100,000 $m^3$ per year. Primarily due to new emissions requirements in the People's Republic of China (PRC), the market for SCR plate catalysts in that country alone will increase to approx. 120,000 $m^3$ per year by 2017.

In the PRC automotive industry, strict requirements on emissions of nitrogen oxides will also be applied from now on for all new trucks. The result of this, as is already the case in Europe and the USA, is that SCR honeycomb catalysts must also be used in trucks. Sales of trucks in the PRC amounted to approx. 3.5 million vehicles in 2011. This will also give rise to increased demand in the coming years. As a result, used catalysts will have to be disposed of after a specified service life.

The sharply increasing demand in the area of titanium oxide-based SCR catalysts has led to an increase in raw material prices in the past few years, as the capacity of producers of titanium dioxide in particular is limited in the anatase modification. A raw material shortage is therefore to be expected in the coming years.

OBJECTS OF THE INVENTION

The object of the new method presented here is to recover from used SCR catalysts the raw materials used in producing these catalysts in such a way that the recovered raw materials can be reused for the production of new catalysts.

SUMMARY OF THE INVENTION

This object is achieved as defined in the independent claims. Advantageous embodiments are defined in the dependent claims.

Accordingly, the invention relates in a first embodiment to a method for reprocessing a used catalyst, preferably an SCR catalyst, including an oxygen-containing compound of titanium, vanadium, and at least one of the elements molybdenum or tungsten, comprising at least step (T4):

(T4) heating of a solid fraction comprising an oxygen-containing compound of titanium and at least one of the elements tungsten or molybdenum in the presence of a vanadium compound at a temperature≥200° C.

In an embodiment, the method further comprises, prior to step (T4), steps (T1) through (T3):

(T1) bringing into contact of the used catalyst with an aqueous base, thus obtaining a water-containing mass, which comprises: a liquid fraction, which comprises a water-soluble material, said water-soluble material preferably comprising a compound of vanadium; and a solid fraction, which comprises a water-insoluble material, preferably wherein the water-insoluble material comprises an oxygen-containing compound of titanium and at least one of the elements molybdenum and tungsten;

(T2) separation of the solid fraction from the liquid fraction of step (T1);

(T3) bringing into contact of the separated solid fraction of step (T2) with a vanadium compound.

In an embodiment, the aqueous base of step (T1) is selected from the group composed of: an aqueous alkali hydroxide, an aqueous alkaline earth hydroxide, an aqueous alkali hydrogen carbonate, an aqueous alkali carbonate, an aqueous alkaline earth carbonate, an aqueous ammonium carbonate or ammonium acetate, aqueous ammonia, an aqueous $C_1$-$C_4$ alkylamine, or an aqueous amino alcohol, or a mixture of two or more thereof.

In an embodiment, the amino alcohol is selected from the group composed of: mono-, di- and triethanolamine, dimethylaminoethanol, diethylaminoethanol, N-methyldiethanolamine, mono-, di- and triisopropanolamine, or two or more thereof.

In an embodiment, the amino alcohol is monoethanolamine (aminoethanol).

In an embodiment, the temperature in step (T1) is in the range of 30 to 100° C.

In an embodiment, the vanadium compound is or comprises an aqueous solution or suspension of an oxygen-containing vanadium compound.

In an embodiment, the vanadium compound is ammonium vanadate or comprises ammonium vanadate.

In an embodiment, the heating of step (T4) takes place in a temperature range of 200 to 1,000° C. or 300 to 900° C. or 400 to 800° C. or 500 to 700° C.

In an embodiment, the method of step (T1) comprises at least one of steps (R1) through (R7):

(R1) mechanical cleaning of the used catalyst, preferably by ultrasound or pressurized gas, preferably compressed air;

(R2) removal of the used catalyst from a catalyst device;

(R3) crushing of the used catalyst, preferably to a grain size of 5 μm to 10 mm or 5 μm to 1 mm or 5 μm to 100 μm;

(R4) crushing of the used catalyst and separation from the crushed used catalyst of accompanying materials contained in the crushed used catalyst;

(R5) bringing into contact of the used catalyst used in step (T1) or the crushed used catalyst obtained in step (R3) or the separated crushed used catalyst obtained in step (R4) with an acid;

(R6) separation of the solid product obtained in step (R5);

(R7) use of the product obtained in steps (R1) through (R6) in step (T1).

In an embodiment, the acid of step (R5) is selected from the group composed of: hydrochloric acid, sulfurous acid, sulfuric acid, phosphoric acid, formic acid, acetic acid, chloroacetic acid, oxalic acid, malonic acid, citric acid, tartaric acid, methane sulfonic acid, benzene sulfonic acid, toluene sulfonic acid, sulfanilic acid, nitric acid, or two or more thereof.

In an embodiment, the temperature in step (R5) is in the range of 10 to 80° C.

In an embodiment, step (T2) comprises at least step (R6):

(R6) washing of the separated solid fraction.

The invention also relates to a composition comprising a solid fraction including an oxygen-containing titanium compound, at least one oxygen-containing compound of at least one of the elements molybdenum and titanium, and a liquid fraction comprising an aqueous base and a water-soluble vanadium compound.

The invention also relates to a method for producing a catalyst or an SCR catalyst comprising a method as defined in the first embodiment, and further comprising at least one of steps (W1), (W2) or (W3):

(W1) application of the product obtained according to step (T4) to a carrier;

(W2) extrusion of the product obtained according to step (T4) into a beehive;

(W3) mixing of the product obtained according to step (T4) with starting products for producing a catalyst, wherein the starting products are selected at least from titanium dioxide or tungsten oxide or molybdenum oxide.

In a second embodiment, the invention relates to a method for separating an oxygen-containing titanium compound and at least one oxygen-containing compound of at least one of the elements vanadium, molybdenum and tungsten from a composition comprising a compound of titanium, silicon and/or aluminum and at least one compound of the elements vanadium, molybdenum and tungsten, wherein the composition is preferably a catalyst, comprising at least steps (S1) through (S3):

(S1) bringing into contact of the composition with an aqueous base, wherein an aqueous mass is obtained which comprises:
  a first liquid fraction comprising a water-soluble material, wherein the water-soluble material comprises at least one compound of at least one of the elements vanadium, molybdenum and tungsten; and
  a first solid fraction, which comprises a water-insoluble material, wherein the water-insoluble material comprises a compound of titanium and silicon and/or aluminum;

(S2) separation of the first liquid fraction from the first solid fraction;

(S3) bringing into contact of the first solid fraction with acid, wherein an acid-containing mass is obtained, which comprises:
  a second liquid fraction comprising an acid-soluble material, wherein the acid-soluble material comprises a titanium compound; and
  a second solid fraction comprising an acid-insoluble material, wherein the acid-insoluble material comprises silicon dioxide and/or aluminium oxide.

In an embodiment, the method comprises at least one further step (S4):

(S4) isolation of the water-soluble material from the first liquid fraction of step (S2).

In an embodiment, the method further comprises at least step (S4.1) or step (S4.2):

(S4.1) if the water-soluble material comprises a vanadium and molybdenum compound, separation of the molybdenum compound from the vanadium compound;

(S4.2) if the water-soluble material comprises a vanadium and tungsten compound, separation of the tungsten compound from the vanadium compound.

In an embodiment, the method further comprises at least step (S5):

(S5) separation of the second liquid fraction from the second solid fraction of step (S3).

In an embodiment, the method further comprises at least steps (S6) through (S7):

(S6) dilution and optional heating of the second liquid fraction of step (S5) with water until a third solid fraction is produced in the form of a precipitate, wherein the third solid fraction comprises a titanium compound, preferably in the form of Ti(OH)$_2$O;

(S7) isolation of the third solid fraction of step (S6).

In an embodiment, the base used in step (S1) is selected from the group composed of: an alkali metal hydroxide, an alkaline earth metal hydroxide, an alkali metal hydrogen carbonate, an alkaline earth metal hydrogen carbonate, an alkali metal carbonate, an alkaline earth metal carbonate, ammonia, an amine, and quaternary ammonia bases.

In an embodiment, the base used in step (S1) is ammonia.

In an embodiment, step (S1) is carried out at a temperature in the range of 30° C. to the reflux temperature of the aqueous base.

In an embodiment, the acid used in step (S3) is selected from the group composed of: hydrochloric acid, hydrobromic acid, nitric acid, sulfuric acid, phosphoric acid, methane sulfonic acid, p-toluene sulfonic acid, acetic acid, trifluoroacetic acid, chloroacetic acid, benzoic acid, and nitric acid.

In an embodiment, the acid used in step (S3) is sulfuric acid.

In an embodiment, step (S3) is carried out at a temperature in the range of 30° C. to the reflux temperature of the acid.

In an embodiment, the method comprises at least step (S8):

(S8) heating of the third solid fraction of step (S7) to a temperature in the range of 100 to 1,000° C., wherein a compound is obtained which comprises TiO$_2$, preferably anatase.

In an embodiment, the first and/or second and/or third solid fraction is/are washed with water.

In an embodiment, the method further comprises, prior to step (S1), at least one of the following steps (S0.1) through (S0.4):

(S0.1) mechanical removal of impurities from the composition, preferably by ultra-sound or pressurized gas, preferably compressed air;
(S0.2) removal of the composition from a catalyst device;
(S0.3) crushing of the composition;
(S0.4) washing of the product obtained in step (S0.3), preferably washing with water.

Further subject matter is a method for producing a catalyst comprising at least one of the reaction steps as defined in the second embodiment and at least one of the following steps (M1) through (M12):

(M1) application of the first water-soluble material of step (S4), (S4.1) or (S4.2) to a carrier;
(M2) application of the third solid fraction of step (S7) to a carrier;
(M3) application of the compound of step (S8) to a carrier;
(M4) application of a mixture of compounds comprising at least one compound of titanium, vanadium, molybdenum, tungsten, silicon and/or aluminum and the first water-soluble material of step (S4), (S4.1) or (S4.2) to a carrier;
(M5) application of a mixture of compounds comprising at least one compound of titanium, vanadium, molybdenum, tungsten, silicon and/or aluminum, and of the third solid fraction of step (S7) to a carrier;
(M6) application of a mixture of compounds comprising at least one compound of titanium, vanadium, molybdenum, tungsten, silicon and/or aluminum and the compound of step (S8) to a carrier;
(M7) extrusion of the first water-soluble material of step (S4), (S4.1) or (S4.2);
(M8) extrusion of the third solid fraction of step (S7);
(M9) extrusion of the compound of step (S8);
(M10) extrusion of a mixture of compounds comprising at least one compound of titanium, vanadium, molybdenum, tungsten, silicon and/or aluminum and the first water-soluble material of step (S4), (S4.1) or (S4.2);
(M11) extrusion of a mixture of compounds comprising at least one compound of titanium, vanadium, molybdenum, tungsten, silicon and/or aluminum and the third solid fraction of step (S7);
(M12) extrusion of a mixture of compounds comprising at least one compound of titanium, vanadium, molybdenum, tungsten, silicon and/or aluminum and the compound of step (S8).

DETAILED DESCRIPTION OF THE INVENTION

First Embodiment

In a first embodiment, the invention relates to a method for reprocessing a used catalyst, preferably an SCR catalyst, including an oxygen-containing compound of titanium, vanadium, and at least one of the elements molybdenum or tungsten.

The phrase "oxygen-containing compound of titanium, vanadium, and at least one of the elements molybdenum or tungsten" includes cases in which the oxides are adjacent to one another, but preferably in the form of mixed oxides. In particular, this phrase includes cases in which at least the oxides of titanium and vanadium are present in the form of mixed oxides, which means that vanadium can occupy lattice sites in the titanium oxide.

According to the invention, the method comprises step (T4), in which a solid fraction comprising an oxygen-containing compound of titanium and at least one of the elements tungsten or molybdenum is heated in the presence of a vanadium compound pound at a temperature≥200° C., wherein the solid fraction is preferably obtained by means of process steps (T1) through (T4) explained below.

Before carrying out step (T4), the used catalyst is preferably brought into contact with an aqueous base in step (T1). A water-containing mass is thus obtained which comprises a solid fraction and a liquid fraction.

The liquid fraction comprises a water-soluble material, said water-soluble material preferably comprising a compound of vanadium.

The solid fraction comprises a water-insolubles material, preferably wherein the water-insoluble material comprises an oxygen-containing compound of titanium and at least one of the elements molybdenum and tungsten.

Preferably, the base used in step (T1) is selected from the group composed of: an aqueous alkali hydroxide, an aqueous alkaline earth hydroxide, an aqueous alkali hydrogen carbonate, an aqueous alkali carbonate, an aqueous alkaline earth carbonate, an aqueous ammonium carbonate or ammonium acetate, aqueous ammonia, an aqueous $C_1$-$C_4$ alkylamine, or an aqueous amino alcohol, or a mixture of two or more thereof.

Preferably, the amino alcohol is selected from the group composed of: mono-, di- and triethanolamine, dimethylaminoethanol, diethylaminoethanol, N-methyldiethanolamine, mono-, di- and triisopropanolamine, or two or more thereof.

In a particularly preferred embodiment, the amino alcohol is monoethanolamine (aminoethanol).

Preferably, the temperature of step (T1) is in the range of 30 to 150° C., and more preferably 30 to 100° C. or 60 to 100° C. Step (T1) can optionally be carried out with or without pressurization.

According to the invention, in step (T2), the solid fraction is separated from the liquid fraction of step (T1).

Separation can be carried out according to known methods, preferably by filtration, centrifugation, sedimentation, and draining of the supernatant. The separated residue is washed with water as needed.

According to the invention, in step (T3), the separated solid fraction of step (T2) is brought into contact with a vanadium compound and then heated according to step (T4).

Preferably, in step (T3), the vanadium compound is brought into contact with an aqueous solution or suspension of an oxygen-containing vanadium compound.

Preferably, the vanadium compound is ammonium vanadate or comprises ammonium vanadate.

Preferably, in step (T3), contact is achieved by spraying the solid fraction with the vanadium compound, preferably in aqueous form, or by pouring or immersion.

According to the invention, in step (T4), the solid fraction comprising an oxygen-containing compound of titanium and at least one of the elements tungsten or molybdenum brought into contact in step (T3) with the vanadium compound is heated at a temperature 200° C.

Heating is preferably carried out in such a way that a solid-state reaction takes place between the solid fraction and the vanadium compound. In this solid-state reaction, vanadium ions are preferably incorporated into the lattice of the oxygen-containing titanium compound. This can be investigated by conventional x-ray tests.

Preferably, the heating of step (T4) takes place in a temperature range of 300 to 1,000° C. or 400 to 800° C. or 500 to 700° C.

Heating can preferably be carried out in conventional tunnel furnaces, rotary furnaces, or muffle furnaces.

The method of steps (T1) through (T4) can further include process steps.

Preferably, the method also comprises in step (T1) at least one of steps (R1) through (R7):
(R1) mechanical cleaning of the used catalyst;
(R2) removal of the used catalyst from a catalyst device;
(R3) crushing of the used catalyst, preferably to a grain size of 5 µm to 10 mm or 5 µm to 1 mm or 5 µm to 100 µm;
(R4) crushing of the used catalyst and separation from the crushed used catalyst of accompanying materials contained in the crushed used catalyst;
(R5) bringing into contact of the used catalyst used in step (T1) or the crushed used catalyst obtained in step (R3) or the separated crushed used catalyst obtained in step (R4) with an acid;
(R6) separation of the solid product obtained in step (R5);
(R7) use of the product obtained in steps (R1) through (R6) in step (T1).

Before carrying out the actual method according to the invention, in step (R1), the used SCR catalysts can therefore, in a first step, be mechanically cleaned of adhering substances, preferably by ultrasound or pressurized gas, preferably compressed air.

In a second step, the catalysts can be removed from the metallic housings or holders that are ordinarily present [step (R2)].

In the case of plate catalysts, physical separation of the ceramic coating from the metallic carrier substrate can also take place.

After this, the SCR catalysts, or in the case of plate catalysts, the ceramic coating mass separated from the metallic carrier substrate, can be mechanically crushed into a powder or into small pieces [step (R3)].

Preferably, the crushing of step (R3) is carried out in a ball mill or a hammer mill.

Preferably, the used catalyst is crushed to a grain size in the range of 5 µm to 10 mm, more preferably 5 µm to 1 mm, and even more preferably 5 µm to 100 µm. In this case, the grain size distribution can be determined by means of common laser scattered-light methods.

Preferably, in step (R3), the used catalyst can also be crushed, and the crushed used catalyst can be separated from accompanying materials contained in said crushed used catalyst, wherein step (R4) is achieved.

In order to remove easily-soluble components or other adhering impurities, the crushed ceramic mass can be washed with water in a suspension, preferably an aqueous acid with a pH between 1 and 6.8 [step (R5)].

Preferably, the acid of step (R5) is selected from the group composed of: hydrochloric acid, sulfurous acid, sulfuric acid, nitric acid, phosphoric acid, formic acid, acetic acid, chloroacetic acid, oxalic acid, malonic acid, citric acid, tartaric acid, methane sulfonic acid, benzene sulfonic acid, toluene sulfonic acid, sulfanilic acid, or two or more thereof.

Preferably, the temperature in step (R5) is in the range of 10 to 60° C.

The crushed ceramic mass can also be treated with water in a suspension, preferably an aqueous acid with a pH between 1 and 6.8.

After this, the insoluble components of the suspension can be separated from the aqueous medium, preferably by filtration, centrifugation, sedimentation, and draining of the supernatant [step (R6)]. The separated residue is washed with water as needed.

The product obtained in one of steps (R1) through (R6) can be used as the starting product in step (T1).

Preferably, step (T2) comprises at least step (R8):
(R8) washing of the separated solid fraction, preferably with water.

Further subject matter of the invention is also a composition comprising a solid fraction including an oxygen-containing titanium compound and at least one oxygen-containing compound of at least one of the elements molybdenum and tungsten and a liquid fraction comprising an aqueous base and a water-soluble compound of vanadium.

Further subject matter of the invention is also a method for producing a catalyst or an SCR catalyst comprising a method as defined above, and further comprising at least one of steps (W1), (W2) or (W3):
(W1) application of the product obtained according to step (T4) to a carrier;
(W2) extrusion of the product obtained according to step (T4) into a beehive;
(W3) mixing of the product obtained according to step (T4) with starting products for producing a catalyst, wherein the starting products are selected at least from titanium dioxide or tungsten oxide or molybdenum oxide.

Steps (W1) through (W3) in the method according to the invention are carried out analogously to known methods, and therefore do not need to be explained in further detail here.

Second Embodiment

Before carrying out the actual method according to the invention, the used SCR catalysts can be mechanically purified of adhering substances in a first step [step (S0.1)].

In a second step, the catalysts can be removed from the metallic housings or holders that are ordinarily present [step (S0.2)].

In the case of plate catalysts, physical separation of the ceramic coating from the metallic carrier substrate can also take place.

After this, the SCR catalysts, or in the case of plate catalysts, the ceramic coating mass separated from the metallic carrier substrate, can be mechanically crushed into a powder or into small pieces [step (S0.3)].

In order to remove easily-soluble components or other adhering impurities, the crushed ceramic mass can be washed with water in a suspension, preferably an aqueous acid with a pH between 1 and 6.8 [step (S0.4)].

The crushed ceramic mass can also be treated with water in a suspension, preferably an aqueous acid with a pH between 1 and 6.8. After this, the insoluble components of the suspension can be separated from the aqueous medium, preferably by filtration, centrifugation, sedimentation, and draining of the supernatant. The separated residue is washed with water as needed.

After this, the crushed mass according to the invention is preferably refluxed with an aqueous solution of ammonia or an amine-containing aqueous solution [step (S1)]. Primary, secondary, and tertiary amines can be used, preferably amines with 1 to 30 carbon atoms. In this case, Mo/V/W or compounds thereof are dissolved as amines in the aqueous solution of molybdate/vanadate/tungstate. $TiO_2$ and $SiO_2$ and/or $Al_2O_3$ remain as residue.

The suspension obtained can be cooled and the remaining residue can be separated from the liquid fraction [step (S2)]. This residue can again be washed with water.

The separated liquid fraction can then be concentrated by partial removal of the solvent. Further processing to obtain pure $(NH_4)_6Mo_7O_{24}$ and $(NH_4)_{10}W_{12}O_{41}$ is described in the patents EP 0555128 A1, WO 1999/058732, and EP 0477450 B1 for Mo/V separation in petrochemical catalysts or can be carried out analogously to this method [steps (S4), (S4.1), (S4.2)].

The residue of step (S2) is then heated in sulfuric acid and can be left therein for several hours while stirring. $TiO_2$ is dissolved out from $Ti(SO_4)_2$ and $TiOSO_4$. $SiO_2$ and/or $Al_2O_3$ remain(s) behind as an insoluble residue [step (S3)].

The residue is separated from the strongly acidic solution [step (S5)]. Optionally, the solution can first be slightly diluted with water.

The clear sulfuric acid solution is then diluted with water and optionally heated until an amorphous solid precipitates which comprises "meta-titanic acid $Ti(OH)_2O$" or consists of this acid [step (S6)].

This solid is isolated, preferably by common methods such as filtration or centrifugation [step (S7)]. The solid can be washed with water in order to remove acid residues, and can optionally be dried.

The BET area of this product is approx. 350 $m^2/g$, which is relevant for low-$SO_2$ conversion. This product can therefore be directly used in the production of catalysts, which is highly advantageous.

Alternatively, this obtained amorphous solid can be heated for further processing, preferably to temperatures <1,000° C., more preferably <650° C., and preferably in a rotary furnace. In this case, crystalline TiO2 of the anatase type forms [step (S8)].

The raw materials obtained according to the invention $TiO_2$, $(NR_4)_6Mo_7O_{24}$, and $(NH_4)_{10}W_{12}O_{41}$ can be reused in the production of titanium oxide-based SCR catalysts. Separated vanadium compounds may also be reused.

Steps (M1) through (M12) of the method according to the invention are carried out analogously to known methods, and therefore do not need to be discussed here in further detail.

The invention claimed is:

1. A method for reprocessing a used catalyst including an oxygen-containing compound of titanium, vanadium, and at least one of the elements molybdenum or tungsten, comprising at least step (T4):
   (T4) heating of a solid fraction comprising an oxygen-containing compound of titanium and at least one of the elements tungsten or molybdenum in the presence of a vanadium compound at a temperature ≥200° C.,
and further comprising steps (T1) through (T3) prior to step (T4):
   (T1) bringing into contact of the used catalyst with an aqueous base, thus obtaining a water-containing mass, which comprises:
      a liquid fraction comprising a water-soluble material, and
      a solid fraction, which comprises a water-insoluble material;
   (T2) separation of the solid fraction from the liquid fraction of step (T1);
   (T3) bringing into contact of the separated solid fraction of step (T2) with a vanadium compound; wherein the aqueous base of step (T1) is selected from the group composed of an aqueous alkali hydroxide, an aqueous alkaline earth hydroxide, an aqueous alkali hydrogen carbonate, an aqueous alkali carbonate, an aqueous alkaline earth carbonate, an aqueous C1-C4 alkylamine, an aqueous amino alcohol, and a mixture of at least two of the aqueous bases thereof.

2. The method as claimed in claim 1, wherein the amino alcohol is selected from the group composed of: mono-, di- and triethanolamine, dimethylaminoethanol, diethylaminoethanol, N-methyldiethanolamine, mono-, di- and triisopropanolamine, or two or more thereof.

3. The method as claimed in claim 1, wherein the amino alcohol is monoethanolamine (aminoethanol).

4. The method as claimed in claim 1, wherein the temperature in step (T1) is in the range of 30 to 100° C.

5. The method as claimed in claim 1, wherein the vanadium compound is an aqueous solution or suspension of an oxygen-containing vanadium compound.

6. The method as claimed in claim 1, wherein the vanadium compound is ammonium vanadate or comprises ammonium vanadate.

7. The method as claimed in claim 1, wherein the heating of step (T4) takes place in a temperature range of 200 to 1,000° C., 300 to 900° C., 400 to 800° C., or 500 to 700° C.

8. The method as claimed in claim 1, wherein the step (T1) comprises at least one of steps (R1) through (R7):
   (R1) mechanical cleaning of the used catalyst, preferably by ultrasound or pressurized gas, preferably compressed air;
   (R2) removal of the used catalyst from a catalyst device;
   (R3) crushing of the used catalyst, preferably to a grain size of 5 μm to 10 mm, 5 μm to 1 mm, or 5 μm to 100 μm;
   (R4) crushing of the used catalyst and separation from the crushed used catalyst of accompanying materials contained in the crushed used catalyst;
   (R5) bringing into contact of the used catalyst used in step (T1) or the crushed used catalyst obtained in step (R3) or the separated crushed used catalyst obtained in step (R4) with an acid;
   (R6) separation of the solid product obtained in step (R5);

(R7) use of the product obtained in steps (R1) through (R6) in step (T1).

9. The method as claimed in claim 8, wherein the acid of step (R5) is selected from the group comprising hydrochloric acid, sulfurous acid, sulfuric acid, phosphoric acid, formic acid, acetic acid, chloroacetic acid, oxalic acid, malonic acid, citric acid, tartaric acid, methane sulfonic acid, benzene sulfonic acid, toluene sulfonic acid, sulfanilic acid, or at least two of the acids thereof.

10. The method as claimed in claim 7, wherein the temperature in step (R5) is in the range of 10 to 80° C.

11. The method as claimed in claim 1, wherein the step (T2) comprises at least step (R6):
(R6) washing of the separated solid fraction.

12. The method as claimed in claim 1, wherein in the step (T1), the water-soluble material comprises a vanadium compound; and wherein the water-insoluble material comprises an oxygen-containing compound of titanium and at least one of the elements molybdenum and tungsten.

13. A method for producing a catalyst or an SCR catalyst, comprising the method of claim 1, and further comprising at least one of steps (W1), (W2) or (W3):
(W1) application of the product obtained as claimed in step (T4) to a carrier;
(W2) extrusion of the product obtained as claimed in step (T4) into a beehive;
(W3) mixing of the product obtained as claimed in step (T4) with starting products for producing a catalyst, wherein the starting products are selected at least from titanium dioxide or tungsten oxide or molybdenum oxide.

14. The method as claimed in claim 13, wherein the catalyst used is an SCR catalyst.

* * * * *